April 16, 1963 R. D. CHAPIN 3,085,364
POTTED PLANT WATERING DEVICE
Filed May 19, 1961 2 Sheets-Sheet 1
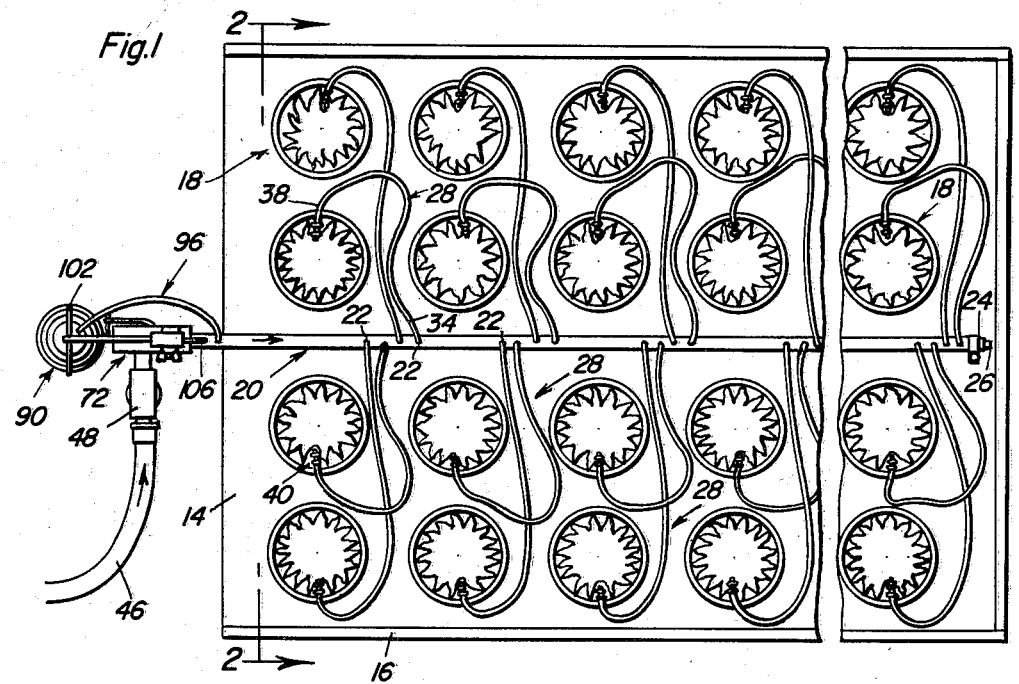
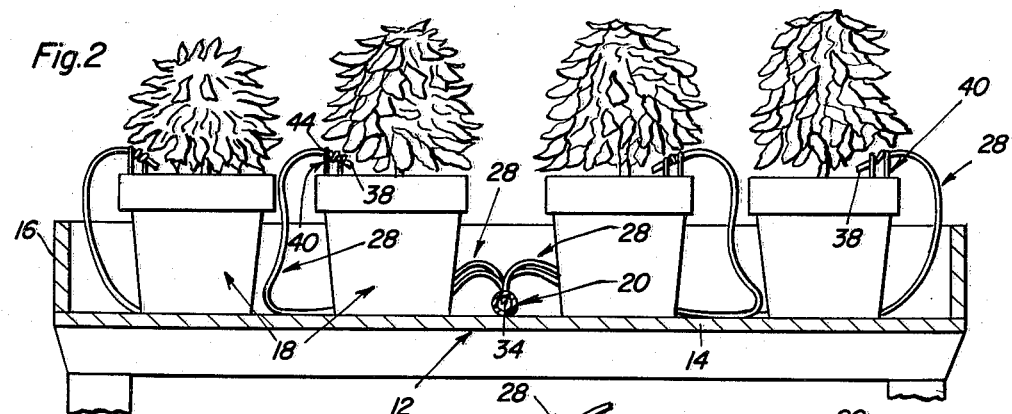
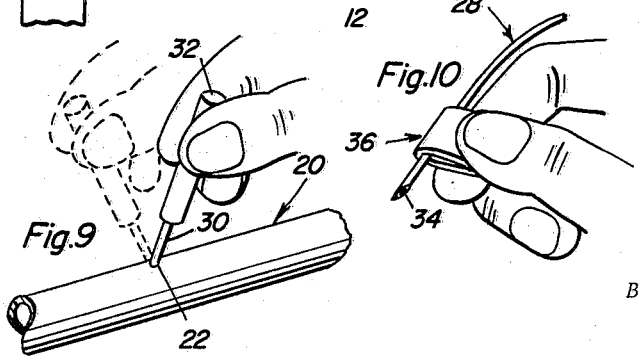
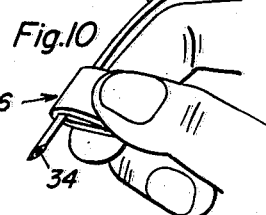
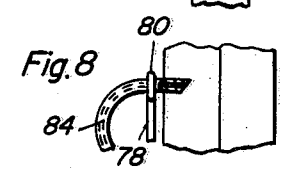
Richard D. Chapin
INVENTOR.
BY *Clarence A. O'Brien*
*and Harvey B. Jacobson*
Attorneys

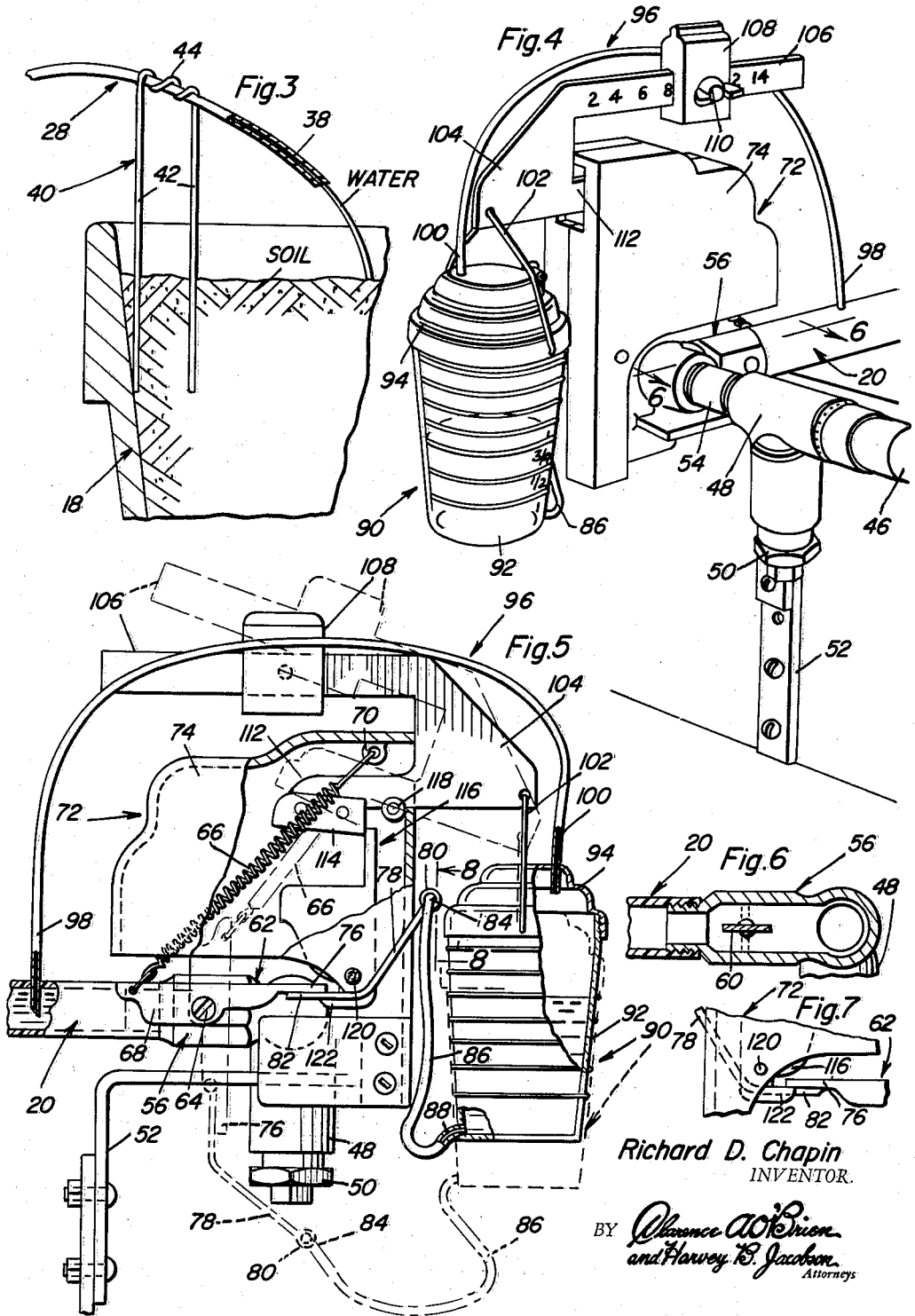

United States Patent Office 3,085,364
Patented Apr. 16, 1963

3,085,364
POTTED PLANT WATERING DEVICE
Richard D. Chapin, 368 N. Colorado Ave.,
Watertown, N.Y.
Filed May 19, 1961, Ser. No. 111,363
7 Claims. (Cl. 47—1)

The present invention relates to watering and irrigating systems which are expressly, though not necessarily, suitably designed and adapted for use in a greenhouse where, as is usually the case, potted plants and flowers are systematically supported in rows to facilitate handling and systematically taking care of a grower's work requirements.

More particularly the concept has to do with simple, practical and efficient means through the medium of which a predetermined amount of water may be fed to the soil in each individual pot, this result being achieved in a manner to satisfactorily eliminate tedious time-consuming hand labor which is being currently resorted to in the majority, it is believed, of greenhouses. Keeping in mind this overall objective it can be full well appreciated that inasmuch as time and labor involve money and since labor is a major expense in the average greenhouse, a reliable automatic water supplying system is a matter of paramount significance and importance here.

In carrying out the principles of the invention an adaptation and system is utilized which functions to water an entire bed or even an entire greenhouse of potted plants with each plant receiving approximately the same amount of water.

Another aspect of the invention which is regarded as advantageous is dependent on the recognized simplicity and efficiency of the overall structural device and the expedient facilities which are utilized and united in providing an effectively usable embodiment thereof.

Briefly summarized the invention involves a practical system for use in conjunction with existing greenhouse benches. To this end a plastic water main is extended down the middle of the bench and is out of the way of the properly arranged rows of potted plants. Each pot is provided with a plastic or equivalent leader or feeder tube, said tube being connected at its intake end to a predetermined portion of the plastic main, the free end of the tube being supported on a simple and practical clip or bracket which is attachable to the pot. The end of the leader tube is thus poised above the level of the soil and the water is fed along the main and through the leader tubes into the soil in the pots either in a slow stream or allowed to enter the soil in rapidly recurring drops.

In connection with the above it will be evident that when a new crop of potted plants is placed on the bench the pot clips holding the plastic leader tubes are simply removed from the plants which are taken out and attached to new potted plants. All this time the plastic leader tubes remain attached to the pot clips. Whenever plants are removed from the bench leaving spaces, the pot clips with the plastic leader tubes attached can be hung on a wire which may be allowed to extend the length of the bench to get them conveniently out of the way.

A further improvement involves the use of novel valve means which is communicatively connectible with the delivery end of the aforementioned plastic main and which is such that it is possible for the grower or attendant to devote attention to matters other than watering the plants as would ordinarily be done by hand. Then, too, with the valve employed it meters and measures the amount of water and shuts itself off after which a container which constitutes a part thereof drains itself and readies the valve for the next watering step. Furthermore the valve is such in construction as to enable one to adjust the amount of water desired for each plant, set a weight on a balance arm and accomplish other advantages to be hereinafter revealed.

In addition to the above the invention is such that it may be properly categorized as simple, economical, dependable, such that it keeps foliage dry, involves a handset valve and employs a valve construction which makes it possible for the grower to set it and forget it.

Numerous other features and advantages will become more readily apparent from the following description and the accompanying illustrative but not restrictive drawings.

In the drawings wherein like numerals are employed to designate like parts throughout the views:

FIGURE 1 is a top plan view on a relatively small scale showing the system and means including, of course, the bench, the rows of potted plants or flowers and other details sufficient to enable the reader to comprehend the invention;

FIGURE 2 is a section, on the transverse line 2—2 of FIGURE 1 looking in the direction of the arrows;

FIGURE 3 is a view in section and elevation of a fragmentary nature showing one of the leader tube clips or brackets and designating the manner in which it functions;

FIGURE 4 is a view in perspective which details the automatic flow controlled cutoff valve;

FIGURE 5 is a view with parts in section and elevation and wherein component parts of the valve are more clearly shown;

FIGURE 6 is a fragmentary detail section taken approximately on the plane of the line 6—6 of FIGURE 4 looking in the direction of the arrows;

FIGURE 7 is a fragmentary view showing component parts of the valve opening and closing lever and the trip latch or lever with which it is connected;

FIGURE 8 is a fragmentary detail view in section and elevation taken approximately on the plane of the line 8—8 of FIGURE 5;

FIGURE 9 is a perspective view showing how one of the orifices in the plastic main may be enlarged with a suitable hand tool; and FIGURE 10 is a fragmentary view in perspective showing how a bent strip of material may be used as a holder to facilitate inserting the mitered end of the leader tube into the orifice provided therefor in the plastic main.

With reference first to FIGURES 1 and 2 the numeral 12 designates a bench or stand such as is commonly used in the average greenhouse. The bottom is denoted at 14 and the usual marginal rim or frame at 16. The bench is usually leg-supported. The potted plants or flowers are individually denoted at 18 and each includes a pot for soil and the plant or flower therein as is obvious. It can be assumed in connection with this invention that the potted plants are arranged systematically in rows. The one-half inch plastic water main 20 is placed on the top of the bench so that it extends lengthwise down the middle of the full length of the bench with the orifices 22 (FIG. 9) facing up. The installation should be such that the main is stretched reasonably tight and is secured at both ends as for example at the right in FIG. 1 by a suitable clip or bracket 24. It is perhaps necessary to insert a plug in this end to close it or to achieve this same result in some other desirable practical manner. The holes in the plastic water main are drilled on the small side so that the joint where the leader tubes are inserted will not leak. This makes it necessary to enlarge the hole so that the leader tube 28 will insert easily. Accordingly the shank 30 of the hand tool 32 (FIG. 9) is inserted in the hole in a slight rotary motion thereby slightly enlarging the hole. One should not enlarge more than just enough to insert the connectible mitered end terminal or portion 34 in place. In practice the hole closes around the tube and makes a tight joint.

As is clear it is necessary to insert one end of the plastic tube into each hole so that the inserted end projects about a quarter of an inch inside the plastic water main. This is brought out to some extent in FIG. 2. This result can be easily accomplished by grasping the plastic leader tube from the end with a rubber gripper 36 (FIG. 10) which is furnished with a kit, comprising all of the essentials of the system, and then inserting the tube into the plastic water main until the rubber gripper touches the plastic water main and thus functions as a sort of a gauge or stop. The discharge end portion 38 (FIG. 3) of each leader tube 28 is supported in delivery position by way of a wire pot clip or bracket 40. This may be an inverted U-shaped wire clip having limbs or legs 42 parallel and embedded in the soil in the pot. The bight portion of the clip 40 is twisted as at 44 and provides a tight though non-crushing mount and retainer for the end of the tube. The pot clip is inserted in the soil in the pot so that the terminal end 38 points downward. For small pots the pot clips can be put on the pot with one prong inside and one prong outside (not shown). Actually it only takes a matter of a half minute or so to enlarge a hole, insert a leader tube and attach one wire pot clip in place.

Since the length of each individual leader tube helps determine the amount of water flowing to each plant the tubes should all be left the same length. The middle row of pots is closer to the water main than the outside row but if the leader tubes are shortened an unevenness in watering would result.

With reference now to FIGURE 4 the hose (see also FIGURE 1) 46 which delivers the city water under pressure is suitably connected to a T-shaped coupling 48 having a suitable strainer (not detailed) therein and with the depending branch having a cleanout plug 50. Any suitable supporting bracket is provided here as at 52. This coupling is joined at 54 to the valve body 56 with which the adjacent end portion of the plastic main 20 is connected as shown in FIGURE 4. With reference now to FIGURE 6 the cutoff valve element is denoted at 60 and it is turned off and on by the spring-loaded valve opening and closing lever 62. In fact the median portion of the lever as at 64 (FIG. 5) is connected with the valve so that by tripping the lever 62 to either the left or right the valve element is opened or closed. A coil spring 66 is connected at one end to the lefthand end portion of the off-on lever as at 68. The other of the spring is anchored at 70 on the interior of the valve housing or casing 72. This housing may be made up of suitably formed and joined half-sections 74. The righthand end portion 76 of the lever 62 is provided with a substantially L-shaped member one limb of which is denoted at 78 and which terminates in an eye 80. The other end portion 82 is welded or otherwise connected to the lever-end 76. A discharge end portion 84 is connected with the eye, this being the end of a drainage hose 86. The other end portion 88 of this hose is connected to the bottom of a water receiving or trapping container 90 and in draining communication with the interior thereof. The receptacle portion of the container is denoted at 92 and the screw cap or cover at 94. A special bypass leader tube is utilized here and the same is denoted at 96 and has one end portion 98 connected to the aforementioned main 20 and the other end portion 100 connected to the cover of the water loaded container 90 for the introduction of water thereto. The wire or equivalent bail 102 carried by the container has a median portion pivotally suspended from the body portion 104 of a balance arm 106. This long arm 106 is provided with suitable graduations as shown in FIG. 4 and carries a manually adjustable weight or slide 108 which is held in the desired position by a releasable fastening means 110. The shorter arm of this balance unit construction extends into the valve casing or housing as at 112 and is provided with a limit stop 114 for the upper flange 116 of a latch or trip lever. The balance means is pivoted in the valve housing as at 118 and the latch lever is pivoted adjacent a lower portion thereof as at 120. This lower end portion is provided with a lip or shoulder 122 which serves as a rest for the free end portion 76 of the aforementioned spring-loaded off-on or valve operating lever 62.

A feature which should be mentioned here is a factor of success of the device which resides in the fact that the relatively tiny plastic leader tubes having a flow passage of approximately capillary size, for example, 1/32 of an inch in diameter, and usually 36 inches long limit the amount of water going to each plant thereby allowing several hundred plants to be watered from a ½ inch plastic main. This limiting factor of the tiny plastic water tubes also allows several hundred plants to be watered from one ½ inch plastic main without substantially reducing the pressure from one end of the plastic main to the other. Manifestly this even pressure the full length of the plastic main causes the plastic leader tubes to flow evenly so that each plant receives the same amount of water.

The metering valve device accurately weighs the amount of water for each plant. Only a few seconds are required to set the device, after which it weighs the water, shuts itself off, drains its plastic container, and is ready to use again. This novel device measures water at any pressure, and is of simple and maintenance-free construction, and can save as much as one or two hours manual labor each time it is operated.

To operate this metering device, raise the lever 62 which contacts the trip lever 116 and causes it to raise until it latches behind the keeper 114. As lever 62 is raised the valve 60 is turned on and water starts to flow through plastic water main 20. Water enters one of the palstic leader tubes 96 and flows into plastic water container 90. When the weight of the water in the plastic container exceeds the predetermined amount (as set on weighted arm 106) the end of the weight arm which supports plastic container goes down and the other end of the weight arm is raised. This raises keeper 114 which in turn releases trip lever 116. The spring 66 exerts pressure on lever 62 which in turn exerts a downward pull on trip lever 116. Trip lever 116 after having been released is pulled in a downward direction by spring 66, and shuts off the valve 60. The end 84 of the drain tube 86 is now lowered with lever 62 and the water drains out of the plastic container 90. The metering valve is now in an "off" position and ready to be used again.

By varying the length of a selected leader tube 28 more or less water can be delivered to a correspondingly selected cooperating plant, that is, if the watering needs suggest doing so.

If a specially constructed coupling or fitting were required in making a connection between a leader tube 28 and the main 20, the monetary aspect of the overall matter would be a factor to consider. But by simply and directly connecting the leader tubes to the main as shown (without expensive fittings) in FIGS. 1 and 2, economy and efficiency are both served.

While the invention is primarily adapted for plants in pots, it nevertheless lends itself with requisite nicety and practicality to use in conjunction with any suitable container, plant box and in fact is applicable to plants growing directly in the ground, outdoors or indoors, say for example indoors in a greenhouse.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use on and in conjunction with a greenhouse bench such as is used to support a plurality of potted plants, a watering device for simultaneously watering all of the plants associated therewith and comprising individual lead tubes having discharge ends releasably connected to their respective potted plants, a single elongated plastic supply and distributing main, corresponding inner ends of all of said tubes being communicatively connected to said main, the discharge end of said main being closed, and cutoff valve means communicatively and operatively connected with the intake end of said main upstream of said tube inner ends, said valve means being constructed so as to permit attachment to a city water delivery line, said valve means being operatively connected to a metering device, said metering device embodying a graduated scale arm pivotally mounted and having an adjustable weight thereon to one side of the point of pivotal mounting, a container operatively connected to and suspended from an end portion of said arm to the other side of the point of pivotal mounting, and an auxiliary feed tube having one end connected with the main and the other end communicatively connected with said container whereby water flowing through said main will be introduced to the container through the auxiliary feed tube causing a pivoting of the arm, upon reaching a predetermined weight, said arm being operatively connected to said valve means for effecting a closing thereof upon the aforementioned pivoting of the arm.

2. The structure defined in claim 1 and wherein said container is provided with a drain hose.

3. In combination, a potted plant watering device comprising a main provided with distributively connected individual pot feed tubes with means for connecting the discharge ends to the individual pots, a cutoff valve communicatively connected with the intake end of said main, and a metering device operatively connected with said valve, said device embodying a spring loaded pivotally mounted lever having a median portion connected with the valve element, a pivotally mounted latch lever, adjacent ends of said levers being cooperatively connected together, said spring loaded lever being provided with a bracket, said bracket supporting a drain hose at one end of the hose, a container, the other end of said hose being connected with the bottom of said container, a pivotally mounted adjustably weighted balance arm, an operating connection between the container and said arm, said arm also embodying a keeper and an end portion of said latch lever being releasably engaged with said keeper, and a container filling tube connected with the main and container, respectively.

4. The combination according to claim 3, and wherein said container has a capacity for a predetermined amount of water which when the mass therein accumulates and reaches a prescribed weight causes the container to descend from a given level to a lower level, said operating connection comprising a pivoted bail which is pivoted on and suspended from said balance arm.

5. For use in conjunction with a plurality of growing plants, a longitudinally elongated main of limited cross-section and predetermined length adapted to be positioned in predetermined relationship in respect to the growing plants, said main being provided with longitudinally spaced orifices, a multiplicity of leader tubes having flow passages of approximately capillary size and being communicatively connected to said main solely by way of direct frictional engagement within the orifices provided therein, and means carried by the outer discharge end of each of said tubes for supporting the same adjacent an individual growing plant and directing the discharge of the fluid toward the soil or similar material in which the plant is growing.

6. The structure of claim 5 wherein said means consist of an inverted U-shaped clip, the bight portion of said clip being coiled for the firm embracing of the discharge end of the tube, the legs of said clip being adapted to be inserted into the plant growing material, one leg of said clip being shorter than the other, the upper end of the one leg of said clip being lower than the upper end of the other leg so as to cause a downward directing of the bight portion and the discharge end.

7. For use in conjunction with a plurality of growing plants, a longitudinally elongated main of limited cross-section and predetermined length adapted to be positioned in predetermined relationship in respect to the growing plants, said main being provided with longitudinally spaced orifices, a multiplicity of leader tubes having flow passages of approximately capillary size and being communicatively connected to said main solely by way of direct frictional engagement within the orifices provided therein, the outer discharge end of each of said tubes being adapted for support adjacent an individual growing plant in a manner so as to direct the discharge of the fluid directly toward the soil or similar material in which the plant is growing.

References Cited in the file of this patent

UNITED STATES PATENTS

| | | |
|---|---|---|
| 1,042,501 | Thompson | Oct. 29, 1912 |
| 1,930,983 | Russell | Oct. 17, 1933 |
| 2,013,447 | Reiter | Sept. 3, 1935 |
| 2,254,102 | Cruse | Aug. 26, 1941 |
| 2,735,699 | Chadbourne | Feb. 21, 1956 |
| 2,760,824 | Leadbetter | Aug. 28, 1956 |
| 2,877,601 | Griggs | Mar. 17, 1959 |

FOREIGN PATENTS

| | | |
|---|---|---|
| 550,799 | Germany | May 20, 1932 |
| 747,061 | Germany | Jan. 27, 1944 |
| 788,977 | Great Britain | Jan. 8, 1958 |
| 116,795 | Sweden | July 9, 1946 |